United States Patent [19]
Levine et al.

[11] Patent Number: 5,446,876
[45] Date of Patent: Aug. 29, 1995

[54] HARDWARE MECHANISM FOR INSTRUCTION/DATA ADDRESS TRACING

[75] Inventors: Frank E. Levine; Brian C. Twichell; Edward H. Welbon, all of Austin, Tex.

[73] Assignee: International Business Machines Corporation, Armonk, N.Y.

[21] Appl. No.: 228,326

[22] Filed: Apr. 15, 1994

[51] Int. Cl.6 .............................................. G06F 13/00
[52] U.S. Cl. .............................. 395/184.01; 364/267.5
[58] Field of Search ....................... 395/578, 775, 800; 364/232.23, 266.6, 267.4, 267.8, 267.5, 285.3

[56] References Cited

U.S. PATENT DOCUMENTS

| | | |
|---|---|---|
| 4,205,370 | 5/1980 | Hirtle . |
| 4,438,490 | 3/1984 | Wilder, Jr. . |
| 4,571,677 | 2/1986 | Hirayama et al. . |
| 4,590,550 | 5/1986 | Eilert et al. . |
| 4,598,364 | 7/1986 | Gum et al. . |
| 4,611,281 | 9/1986 | Suko et al. . |
| 4,636,941 | 1/1987 | Suko . |
| 4,695,946 | 9/1987 | Andreasen et al. . |
| 4,783,762 | 11/1988 | Inoue et al. . |
| 4,802,165 | 1/1989 | Ream . |
| 4,879,646 | 11/1989 | Iwasaki et al. . |
| 5,073,968 | 12/1991 | Morrison . |
| 5,127,103 | 6/1992 | Hill et al. . |
| 5,134,701 | 7/1992 | Mueller et al. . |
| 5,146,586 | 9/1992 | Nakano . |
| 5,182,811 | 1/1993 | Sakamura ........................ 395/800 |
| 5,220,669 | 6/1993 | Baum et al. . |

FOREIGN PATENT DOCUMENTS

| | | |
|---|---|---|
| 0270983A2 | 6/1988 | European Pat. Off. . |
| 0501076A2 | 9/1992 | European Pat. Off. . |
| 0525672A2 | 2/1993 | European Pat. Off. . |

*Primary Examiner*—Vincent P. Canney
*Attorney, Agent, or Firm*—Mark E. McBurney

[57] ABSTRACT

An improved instruction tracing mechanism provides a combination of hardware, internal to the CPU, and novel software. Additional registers are added to interconnected to the CPU. These registers store values indicating the instruction address, data address, whether the instruction was a load or store, the number of bytes moved and whether any address mapping changes occurred. The registers are read by a trace interrupt handler which then provides the information to a trace buffer and a profile buffer. The end user can then access the trace and profile information through the input/output (I/O) system of the data processing system.

16 Claims, 6 Drawing Sheets

HARDWARE MECHANISM FOR INSTRUCTION/DATA ADDRESS TRACING

BACKGROUND OF THE INVENTION

1. Field of the Invention

The present invention generally relates to evaluating the instruction stream in a data processing system in order to optimize the performance of the system. More specifically, the present invention is a tracing mechanism, implemented in system hardware, that allows for trace and profile characteristics of instructions executed by a central processing unit (CPU) to be generated for use by a system designer.

2. Description of Related Art

It is well known that performance projections for processors and memory subsystems are critically dependent on a correct understanding of the workloads imposed on such systems. One of the most important components of a system's workload is the instruction stream executed by the processor. In order to accurately predict the performance of proposed systems and assist in selecting among various design trade-offs, it is necessary to collect instruction streams (i.e. traces) that statistically represent actual workloads.

In order to be most useful, the trace instruction stream must include the effective operand (data) addresses as well as the effective instruction addresses that comprise the workload. This is particularly true in processor organizations involving multiple issue instruction dispatch and/or hierarchical storage subsystems. In such organizations data dependencies can severely degrade performance. It is therefore important that operand addresses be collected along with instruction addresses. If the developer knows whether the data is being accessed from a particular location in the memory subsystem, e.g. for loads and stores the data is accessed at addresses very close to one another, then various hardware performance characteristics, such as locality can be implemented. For example, locality allows the hardware system to take advantage of the fact that data is being accessed at neighboring addresses in the memory subsystem.

Conventional trace tools are generally in the form of software, or a hardware tracing device which is external to the CPU, both of which have significant drawbacks. Software tools, such as described in European Patent Application 0 501 076 A2 are very slow, because the instruction stream being traced must be preprocessed and then postprocessed to derive the actual information needed for the trace.

Those skilled in the art will understand that, due to the preprocessing and postprocessing, a software facility incurs a slow down of 30 to 1 or more and thus perturbs execution paths. Clearly a slow down of this magnitude will tend to change the apparent balance between CPU and I/O processing loads. The trace streams collected from a system in such an unbalanced state will thus be nonrepresentative and adversely affect the predictions of performance models using them.

Other conventional trace tools include external hardware tracing devices, such as shown in European Patent Application 0 525 672 A2 are also slow, since the trace device is connected to the processor by the system bus, which typically runs slower than the processor speed. Similarly, U.S. Pat. No. 4,611,281 shows an apparatus for analyzing microprocessor operations wherein a separate test system is connected to the processor being analyzed.

However, while it is possible to construct system hardware, external to the CPU that will collect instruction streams, it is not the most useful or flexible method. This is due to the cost of providing the data paths to provide the information, the external media required to capture the information and the difficulty entailed in selecting when to trace (i.e., controlling the tracing) that usually accompanies such external hardware tracing.

Further, external hardware trace facilities usually slow down the traced system. This stems from the fact that the performance of virtually all processor designs are highly dependent on hierarchical storage subsystems. Hierarchical storage subsystems tend to render the instruction/data streams inaccessible. Correcting this problem typically involves disabling or crippling some portion of the storage hierarchy (e.g. disabling the first level of caching so that the instruction/data fetches are visible). This approach will cause hardware tracing to degrade CPU performance.

Another prior art external hardware trace approach involves broadcasting a branch taken, i.e. interrupt and operand addresses in an observable manner (e.g. by "stealing" cycles from a system bus). In this way, changes in instruction stream flow can be observed. But, in multiple dispatch machine organizations, the frequency of taken branches, such as loads and stores can be high enough to consume substantial system bus bandwidth, potentially impacting performance. Aggravating this problem is the trend towards external bus rates that are a fraction of the processor internal speed.

A problem unique to external hardware tracing devices is that the required additional instrumentation tends to be nonportable and costly, typically requiring that a system be dedicated to tracing. This can be an obstacle to collecting useful traces since the code or system configuration of desirable workloads may be prohibitively difficult or expensive to install on the dedicated trace system.

U.S. Pat. No. 5,146,586 shows a tracer memory, directly connected to an instruction register, that will concurrently store instructions as they are provided to the execution unit. However, in this case, the actual address from which the data was retrieved (for load instructions) or to which the data is being stored (for store instructions) will not be known. The actual location at which the data was accessed will only be known after the instruction has executed.

It can be seen that a tracing tool that combines the simplicity of hardware and the flexibility of software to give real time results would be advantageous. Further, a tracing system that records the actual storage location where the data was accessed would also be an advantage.

SUMMARY OF THE INVENTION

In contrast to the prior art, the present invention provides a combination of hardware, internal to the CPU, and software which make tracing of instruction much faster and more efficient.

Broadly, several registers are added to the CPU that store value indicating the instruction address, data address, whether the instruction was a load or store, the number of bytes moved and whether any address mapping changes occurred. These registers are then read by a trace interrupt handler which then provides the information to a trace buffer and a profile buffer. The end user can then access the trace and profile information through the input/output (I/O) system of the data processing system. That is, the user can read the information from the display, store it to a disk, or the like.

The trace facility of the present invention allows improved performance when compared to prior art software and external hardware systems, and provides the additional information of the address from which the data is retrieved, or stored.

These and other objects, features and advantages will become apparent to those skilled in the art upon considering the subsequent description taken in conjunction with the attached drawings.

DETAILED DESCRIPTION OF THE PREFERRED EMBODIMENTS

Generally, tracing tools are used to evaluate program applications running on a particular computer system. In particular the instructions to be executed by the CPU are analyzed for their content. Another important aspect of tracing is to determine where the operand data to be manipulated by the instruction is stored. That is, what is the address of the data to be operated on by the instruction? This information will allow a system designer to implement methods that will improve the performance of the software.. These methods include improvements to the software itself, and improvements to future hardware systems.

More specifically, a program to be evaluated is run in conjunction with a testing tool, such as a tracing tool, or the like. This tracing tool will output two basic types of information. First, profile data that is essentially a set of counts corresponding to the instructions executed by the CPU. For example, the profile data may include the number of instructions that were executed by a given software routine. This information is then used by the system designer to optimize the performance of the software and/or hardware running the program. That is, the designer will look at the number of instructions executed per routine and try to minimize these executions to make the program run more efficiently. Additionally, the profile data will provide information regarding code coverage of the trace, i.e. how many lines of code (LOC) executed during the test. This information will tell the designer how reliable the trace test was. The more LOC that were executed, the higher the test coverage and the better the test.

Second, a trace tool will output trace information which is time sequences of events that occurred on the CPU. More particularly, the trace information includes instructions that executed on the processor and when these instructions executed. One common used of trace information is in the area of hardware simulation. Often computer hardware designers will create a software model of a chip being designed. Before the design is actually committed to fabrication, the traces information can be used as input to the model and the output monitored to determine how well a proposed hardware design will run the program corresponding to the trace input. This is a great advantage, since hardware designers have the capability of knowing, before the chip(s) are even fabricated, how well certain programs will operate on the designed system.

Trace information is also used for performance debugging to look at where the program stores and retrieves operands, when the CPU executed the instructions, and the like. This will allow the hardware designers to understand how their system works when running a particular program. It also gives the software designers more information about how their program operates and lets them optimize its performance. To improve both the robustness and performance of the trace facility of the present invention, the following hardware support has been provided in the CPU. The central processing unit may be one of the PowerPC microprocessors available from IBM Corp. (PowerPC is a trademark of IBM Corp.). The CPU of the present invention includes a single step interrupt capability that vectors uniquely to a trace exception handler before the execution of each next instruction. Additionally, special registers, the Saved Instruction Address (SIA) and Saved Data Address (SDA) are provided that will contain the effective address of the last architecturally successfully executed instruction and the instruction's operand. A bit field that can be tested to determine if the last architecturally successfully executed instruction was a load or store is provided such that these bits are used to validate the content of the SDA.

A bit field that can be tested to determine if the last architecturally successfully executed instruction was a load or store multiple is provided. These bits are used to determine if the number of memory elements accessed by the load or store was dynamically determined and not easily obtained via post processing. Another bit field is provided that can be tested to determine if the last architecturally successfully executed instruction altered the effective to virtual address map. This results in considerable savings to the trace overhead since conventional current software testing requires that addresses in machine code be .correlated with source code (i.e. the corresponding high level language statements that generate the machine code). Further, a control mechanism is provided that either allows or disallows the assertion of the trace interrupt before execution of each instruction.

The present invention utilizes a software trace algorithm in conjunction with hardware additions to the CPU to efficiently provide instruction profiles and traces in conjunction with data address which the instructions operated on. When trace is enabled, a trace exception interrupt is taken before each instruction execution. Once the trace exception handler receives control, a pointer will indicate the address of the next instruction to be executed. As the last step of the prior trace interrupt, the previous instruction address will have been saved in a memory location (Last_Instruction_Address). Thus, the memory location will contain the .address of the last architecturally successfully executed instruction. If the content of memory location with the last data address represents a break in flow of the traced instruction stream (e.g. branch etc.) then the contents of that memory location are written to the trace medium (typically a buffer in memory).

If the last architecturally successfully executed instruction was a load or store then the address of the operand will be contained in the SDA and will be written to the trace medium. A bit field, as described above, is then used to make the required determination as to whether the instruction was a load or store. If the number of items accessed was dynamically determined, then the actual number must be noted on the trace medium. Another bit field, also as described above, is then used to make the required determination as to whether the instruction was a load multiple or a store multiple. If the addressability (effective to virtual address mapping) has been changed then the aspect that changed (e.g. BAT or SEG registers) must be noted on the trace medium. The bit field that determines if the executed instruction altered the effective to virtual address map is used to make the required determination. After utilizing the content of the address of the last instruction, the content of that memory location is replaced by the content of the current instruction address in anticipation of the next trace handler invocation. Thus, sequential instruction streams are traced.

There are two major performance improvements. The first is that the effort expended in computing the last instructions operand address and length has been reduced to testing bit fields (to determine if the last instruction executed was a load or store, or a load or store multiple, respectively). These bit fields along with the SDA register eliminate the need for instrumentation of the loads and stores in the traced code.

The second performance improvement is that detecting effective to virtual address mapping changes is very efficient, being reduced to testing the bit field that determines if the effective to virtual address mapping has been altered. Since the overall rate of addressability changes is typically low, knowing when addressability has not changed allows addressability searches to be performed only when required thus benefiting performance.

A significant improvement in the robustness of the software tracing aspect of the present invention comes about as consequence of the simplifications afforded the tracing software by the ability to determine when the effective to virtual addressing has changed. Also, the addition of the ability to efficiently determine the operand addresses and lengths makes the mechanism which eliminates the need to manage the tracing of various system components more operable.

The current estimate for the trace handler of the present invention places the path length at 15 instructions when there is no write to the trace medium, e.g. trace buffer, and 20 instructions when there is a write to the trace medium. Assuming a basic block length of 5 instructions, the percentage of load and stores in the traced instructions stream to be 40% and the percentage of taken branches to be 5%, leads to a mean interrupt handler path length of 17.25 instructions.

Assuming an interrupt latency of 10 cycles and an interrupt Cycles Per Instruction (CPI) figure of 0.8 the mean number of cycles added to the execution time of each instruction of the workload will be about 23.8 cycles. Since most processor instructions contemplated by the present invention can execute in one cycle, the effective CPI for the traced workload would be about 24.8 cycles per instruction.

Note that there is no need to disable the caches in software tracing. The least recently used (LRU) replacement strategy of the caches essentially insures that when software tracing, the trace code will be in the cache, thus the trace handler CPI may be less than 0.8 and consequently execute in less that 24.8 cycles. Also, since the trace interrupt is a special case, the present invention can take into account the special conditions surrounding a trace interrupt. Consequently, it is reasonable to believe that it is possible to obtain very attractive trace execution rates.

A performance contrast exists between the present invention, which utilizes both a novel hardware scheme and a new software portion, to that of the typical cache inhibited external hardware trace scheme. In machines that depend on low cache miss rates, the cache inhibited scheme may result in a severe penalty, i.e. the more code parallelism a processor can exploit, the more critical the cache miss ratio will be to the processor's performance.

Assuming the following simple linear model of execution:

$$CPI(Miss\_Ration) = CPI_{infinity} + Miss\_Ratio \times Miss\_Cost$$

The degree to which the processor is slowed down by hardware tracing that disables the cache is:

$$Trace\_Slow\_Down = \frac{CPI(Tracing\ Miss\ Ration = 100\%)}{CPI(Normal\_Miss\_Ratio)}$$

Applying the linear mode; to the last equation gives the following:

$$Trace\_Slow\_Down = \frac{1 + \frac{Miss\ Cost}{CPI_{infinity}}}{1 + Normal\_Miss\_Ratio \times \frac{Miss\ Cost}{CPI_{infinity}}}$$

Assuming that the code being traced has an infinite cache CPI of 1.6, the cost of a miss is 16 cycles and the normal miss ratio is 1% then the trace slow down is about 10. On the other hand, if the code being traced has an infinite cache CPI of 0.25, the cost of a miss is 16 cycles and the normal miss ratio is 0.5% then the trace slow down is about 49.1.

This last value corresponds to an effective workload CPI while hardware tracing of 12.3 cycles per instruction. Assuming that a processor capable of sustaining a workload CPI of 0.25 when not tracing can also provide a trace handler CPI of 0.5, the effective workload CPI while software tracing would be 19.5 cycles per instruction or about 58% slower than hardware tracing.

The above computations are examples intended to show that in a real processor the slow down imposed by external hardware tracing can actually turn out to be comparable to that of software tracing, in other words, there is no real advantage of external hardware tracing over software tracing. Thus, the present invention becomes very attractive when compared to the prior art systems. This is particularly true for machines that exploit code parallelism and multiple storage hierarchies.

Other limitations such as electrical loading of high speed signals by trace equipment could force the traced system to be operated at a reduced clock frequency resulting in a further decrease of the speed of hardware tracing. Also, most RISC processors have external busses that run at a fraction of the speed of the processor which accentuates the bandwidth requirements of hardware tracing. Such problems can only worsen as machine clock speeds become higher and packaging becomes more dense. It is inevitable that hardware tracing will continue to become increasingly less tractable and software tracing increasingly more tractable.

Further, the present invention includes a register denoted the "Saved Instruction Address" or SIA. The SDA is an important aspect of the present invention since it will eliminate unnecessary instructions in the trace handler. As described above, reducing path length reflects directly in the performance of the trace.

With the disclosed hardware and software features of the present invention, useful traces can be inexpensively captured with reasonable performance degradation from a standard machine (i.e., a machine not dedicated to tracing). A distinct advantage of this is that stand alone data processing systems including the processor of the present invention can be used to trace instructions, without having either an external hardware tracing device, or special purpose tracing software, thus, providing more utility to the end user.

Figure 1:
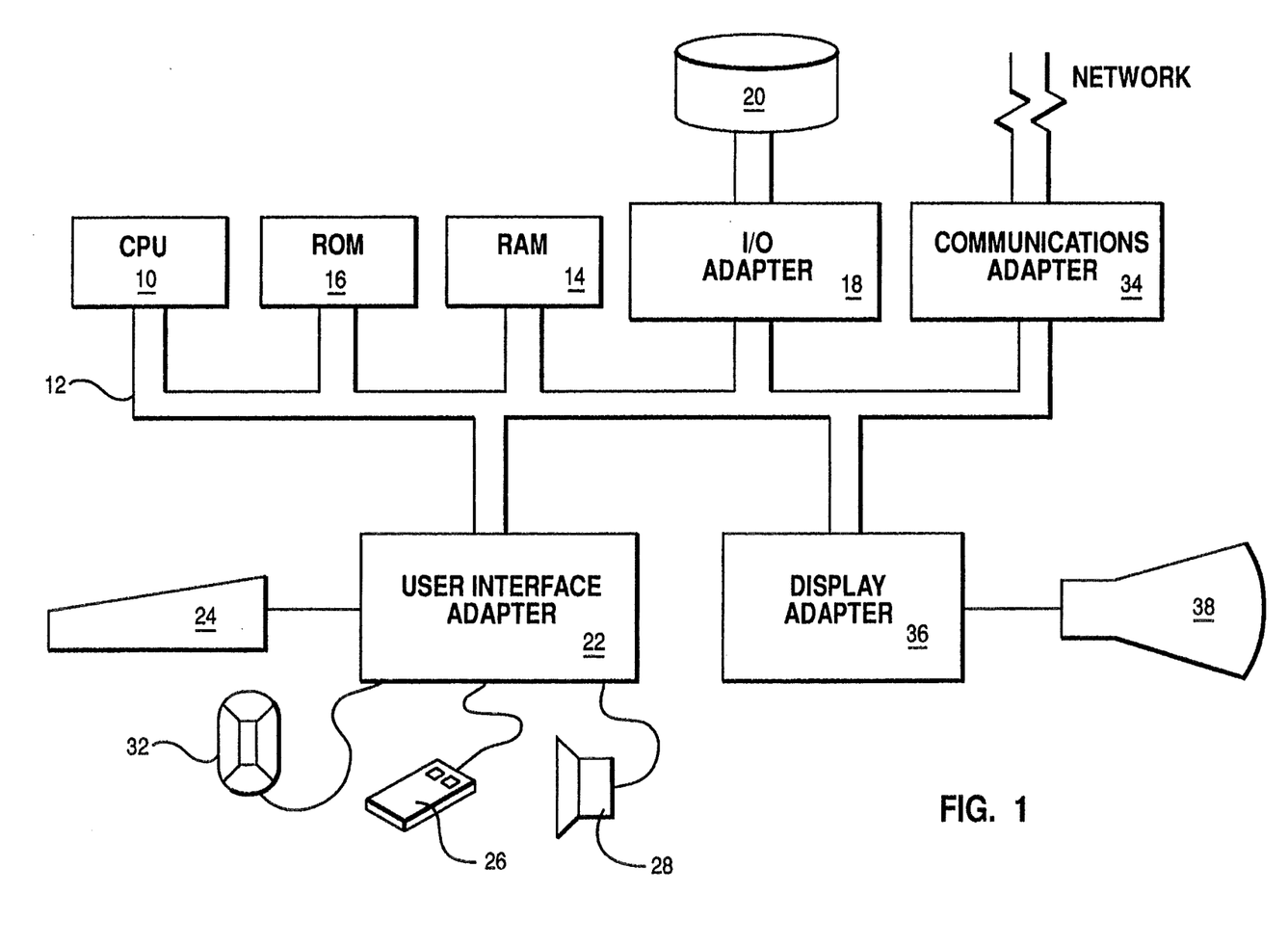
FIG. 1 is a block of a data processing having a central processing unit including the trace facility of the present invention.

Referring to FIG. 1, a typical data processing system is shown which may be used in conjunction with the present invention. A central processing unit (CPU), such as the PowerPC 604 microprocessor (PowerPC is a trademark of IBM) commercially available from IBM is provided and interconnected to the various other components by system bus 12. It should be noted that the hardware trace mechanism of the present invention is part of the function which is included in CPU 10. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. Expanded memory 15 is additional RAM added to the data processing system and is also shown interconnected to bus 12. I/O adapter 18 may be a small computer system interface (SCSI) adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboard 24, trackball 32 or mouse 26 and receiving output from the system via speaker 28 and display 38.. Additionally, an operating system such as DOS or the OS/2 system (OS/2 is a Trademark of IBM Corporation) is used to coordinate the functions of the various components shown in FIG. 1.

Figure 2:
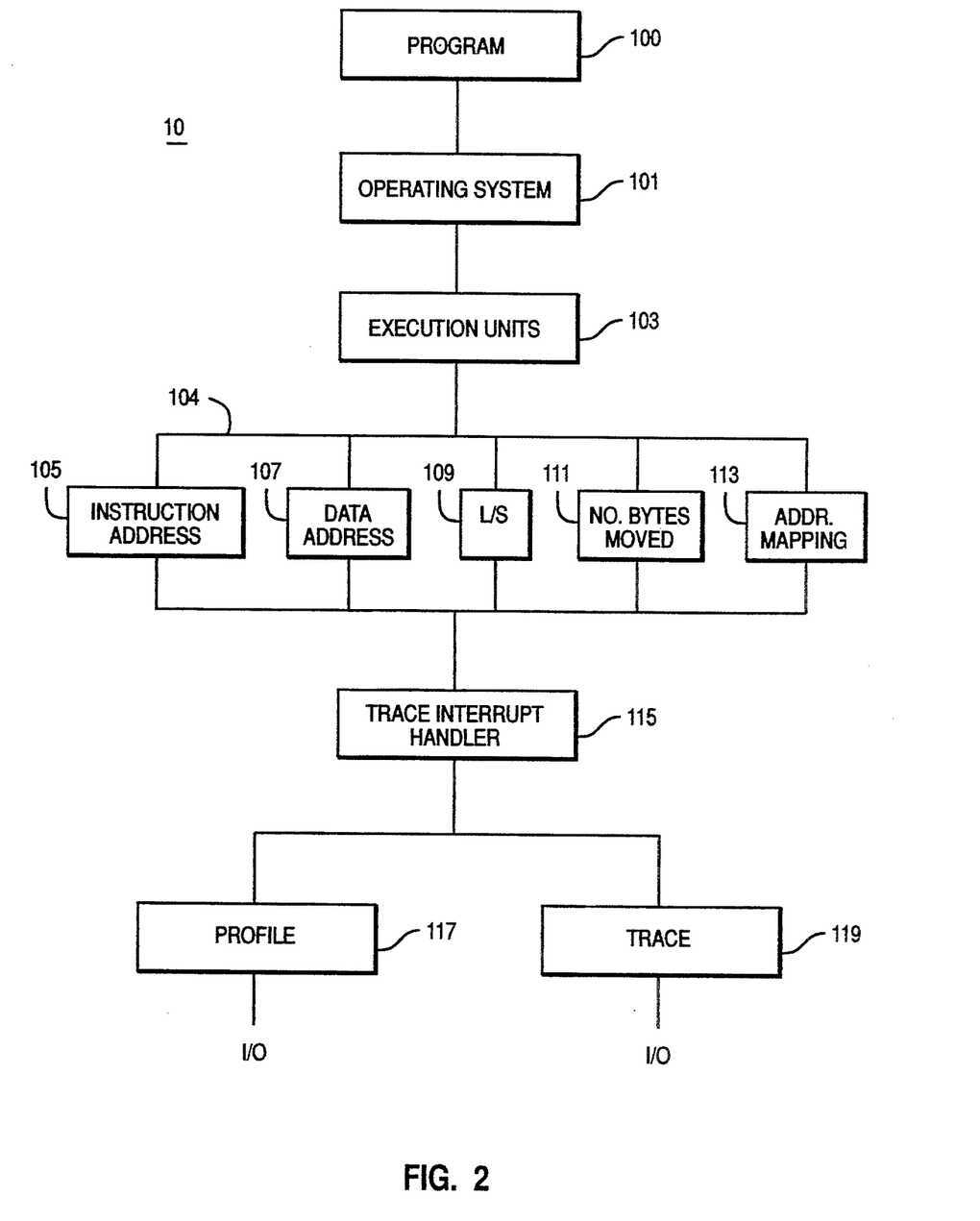
FIG. 2 is a block diagram of the hardware aspect of the present invention that is included in the central processing unit.
Figure 3A:
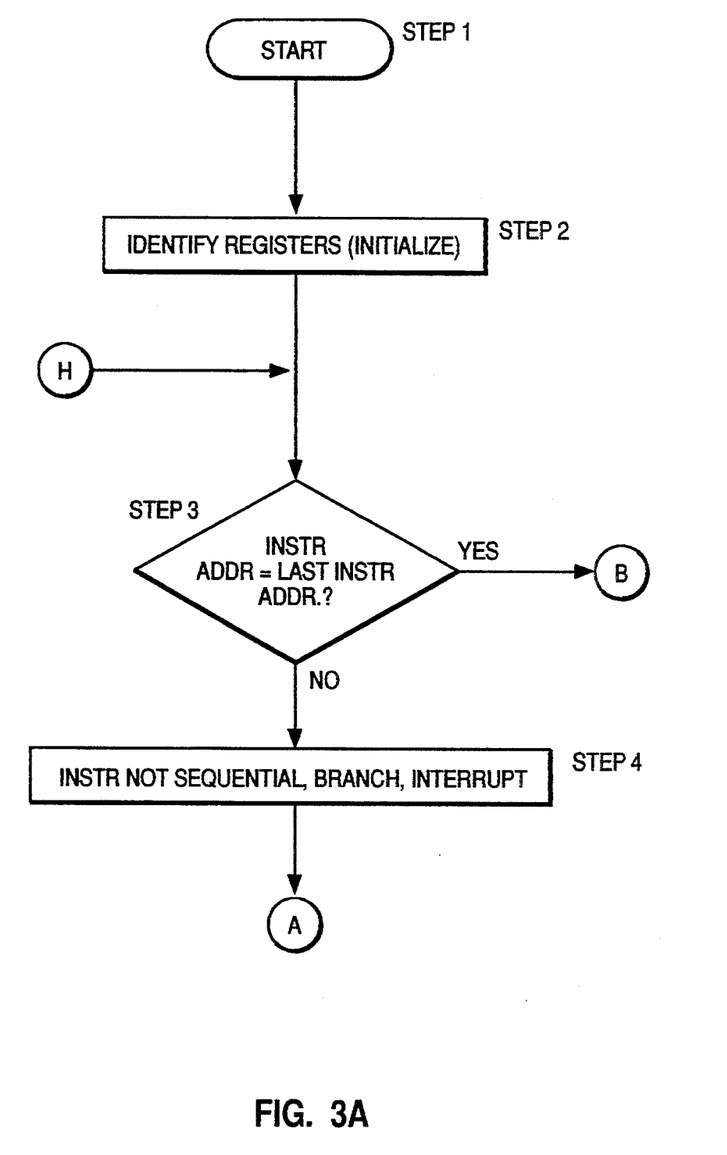
FIG. 3 consisting of 3A-3D is a flow chart showing the process steps implemented by the software aspect of the present invention.
Figure 3B:
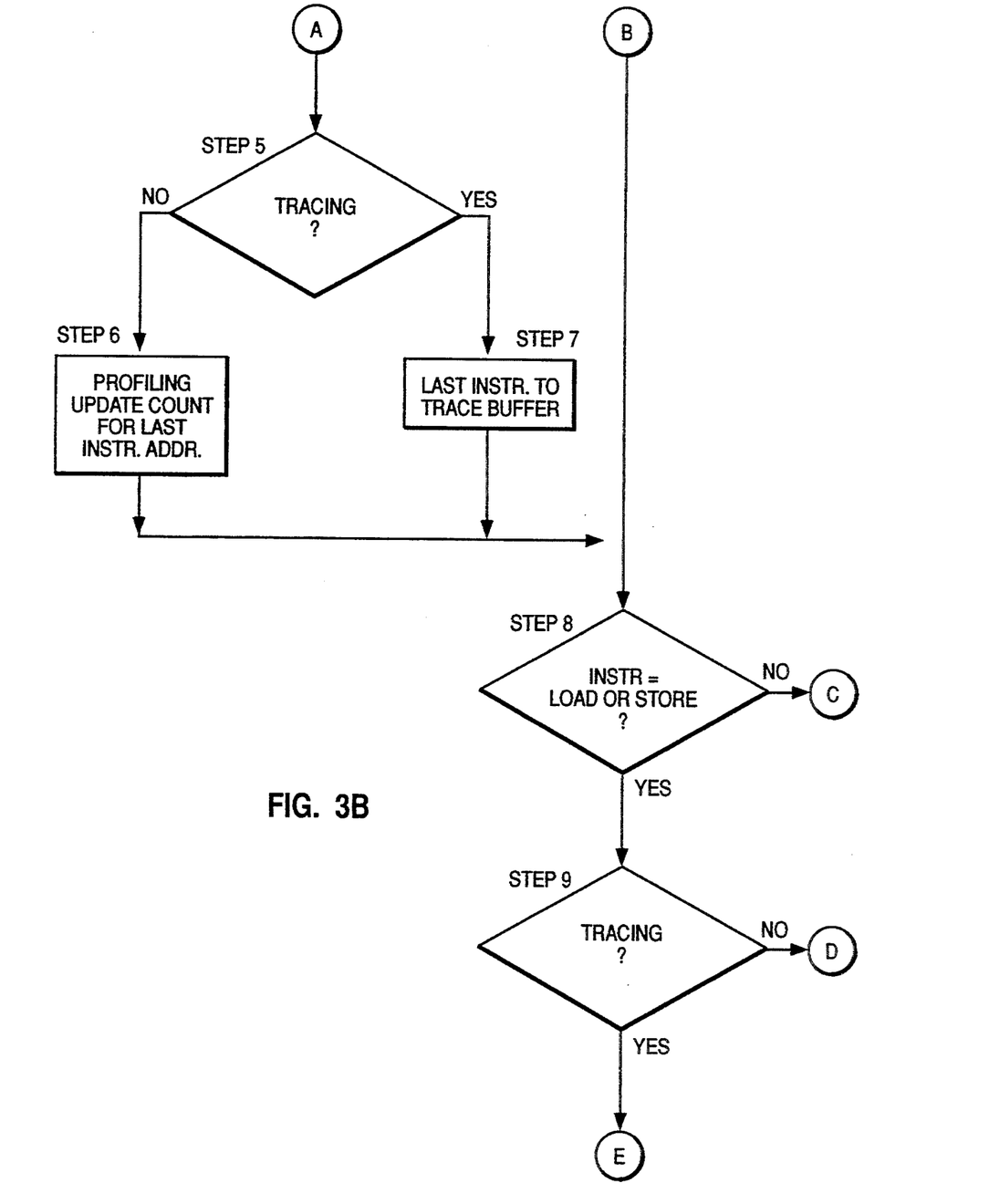
Figure 3C:
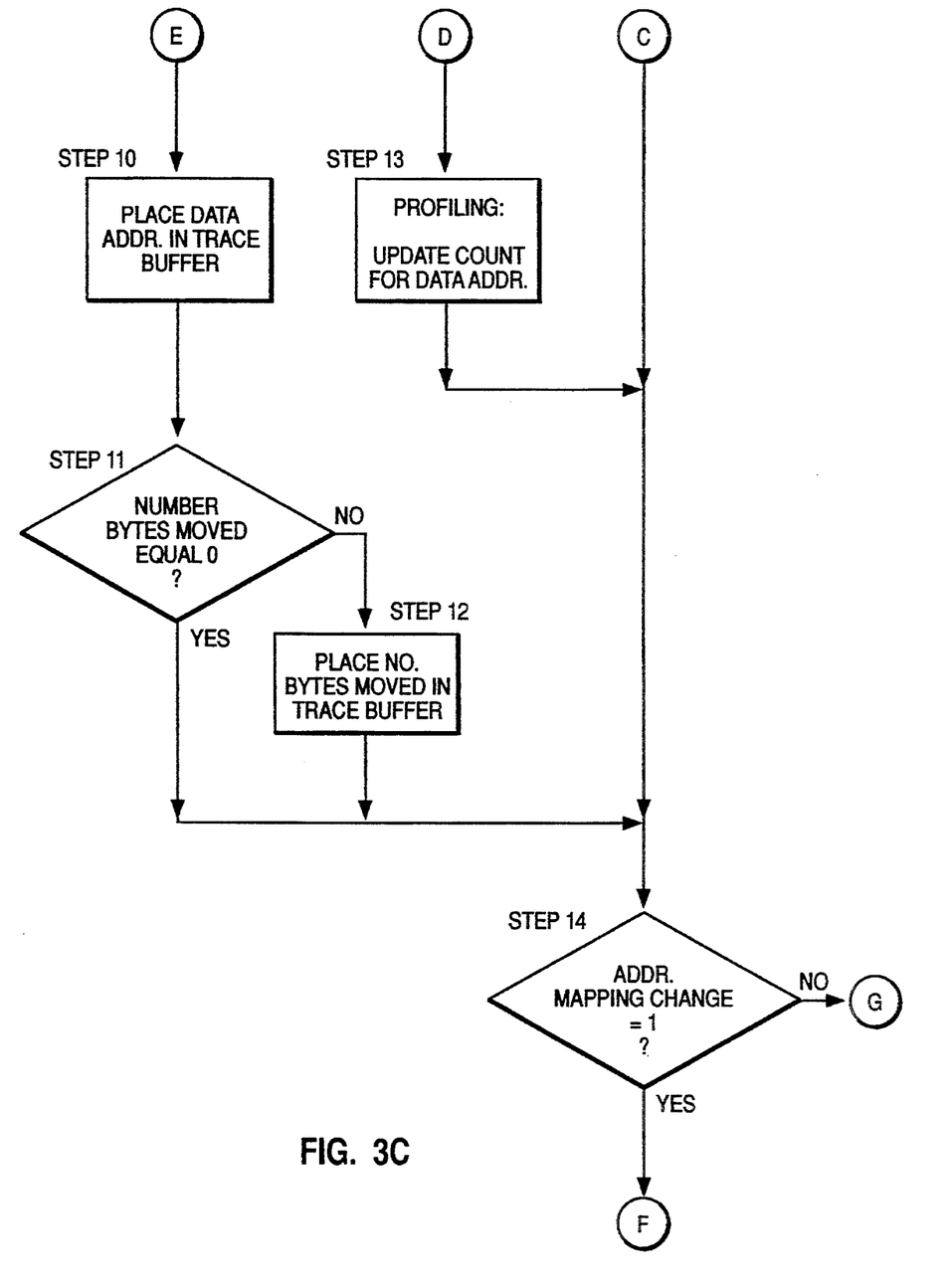
Figure 3D:
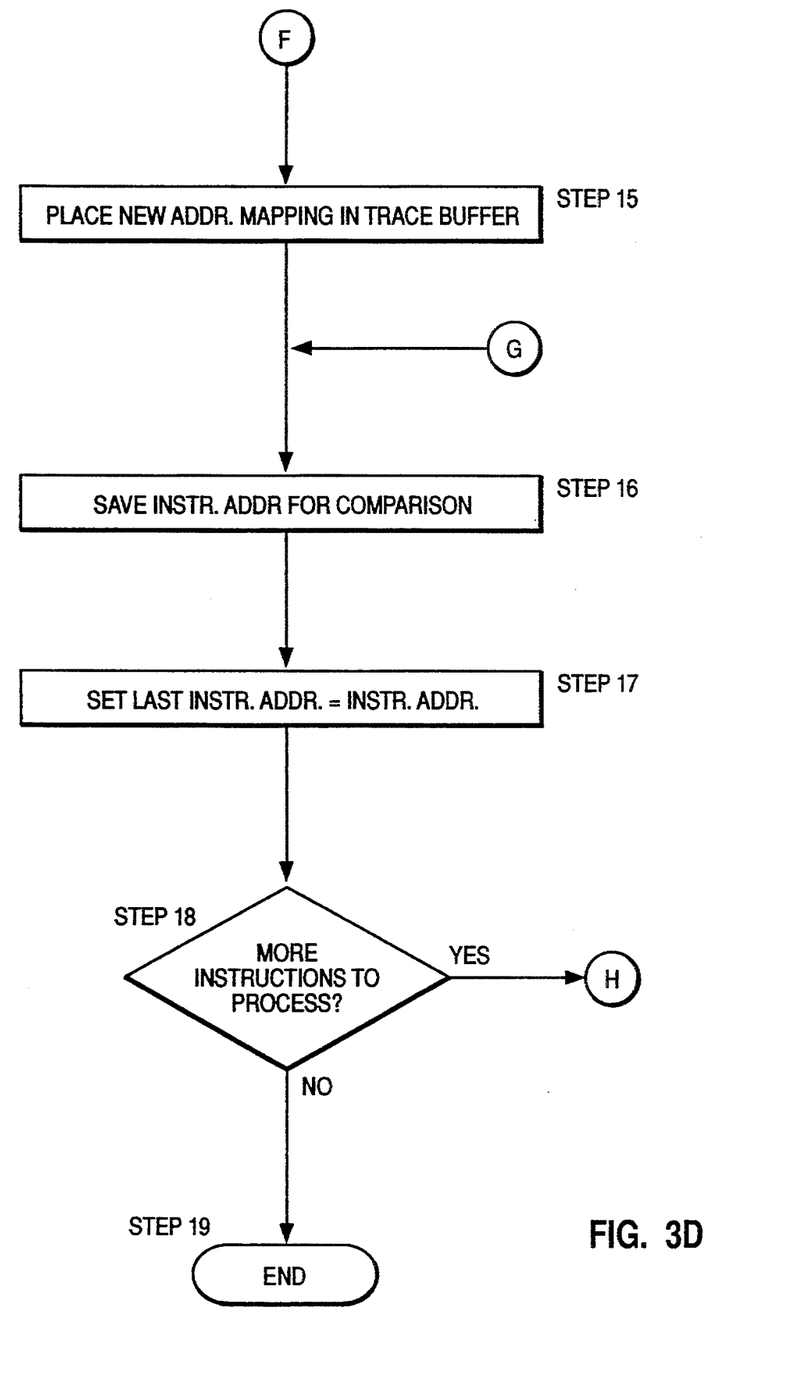

Referring to FIG. 2, a CPU is shown including the tracing hardware of the present invention. Reference 10 refers generally a CPU as is shown in FIG. 1. A computer software program 100 is installed and running in conjunction with an operating system 101, which may be one of AIX, DOS, OS/2, or the like (AIX and OS/2 are trademarks of IBM Corp.). The operating system 101 controls the basic functions of the computer system.

In a preferred embodiment of the present invention, CPU 10 will be one of the IBM reduced instruction set computer (RISC), processing systems as implemented in the POWER and PowerPC Architecture (POWER and PowerPC are trademarks of IBM Corp.). Execution unit 103 will include both a fixed point unit (FXU) and a floating point unit (FPU). The FXU being used primarily for integer processing, while the FPU is normally used for processing number in scientific notation. Both of these execution units receive instructions from an instruction cache unit. The FPU and FXU output information to a bus 104 which is connected to a plurality of register files. Register 105 will contain the instruction address, and register 107 will store the data address (address from which the data is retrieved during a load operation, and the address to which the data is being stored for a store operation). The Load/Store register 109 will contain a binary value that will indicate if either a load or store instruction was executed, by any of the execution units in CPU 10. The Number_of_Bytes_Moved register 111 will include a value representative of the number of bytes of data moved to the memory location during a load or store instruction (if a load or store instruction was actually executed, as indicated by the value in register 109). It should be noted that the term "memory location" as used herein will include all of the components of a hierarchical memory subsystem, including a level one (L1) cache, level two (L2) cache, instruction cache unit, and the like.

Register 113 will contain a specific binary value indicating whether or not the effective to virtual address mapping scheme was changed by the previous instruction. This information is very important in a tracing context, since it may be necessary to use the physical address (data or instruction) to recreate the actual instruction that was executed, or data that was accessed. A mapping table, or look-up table is used to map a 32 bit effective address into a 52 bit virtual address. The actual physical address of the data or instruction is then determined from the virtual address. Periodically, instructions alter, or change, the content of the look-up table such that a particular effective address maps to a different virtual address. It is imperative that the tracing tool log the changes to the table occur when they occur. Otherwise, the actual data or instruction at a specified address may not be obtained by working backwards from the physical address to the virtual address to the effective address.

Trace interrupt handler 115 is a routine contained in the software operating system. The process implemented by this program will be more fully described below in conjunction with the flowchart of FIG. 3. Basically, the trace interrupt handler will read the addresses in registers 105 and 107, along with the values in registers 109, 111, 113 and determine whether this information relates to tracing or profiling of the instructions corresponding to program 100 that is being run. For profile information, the appropriate register contents are placed in a profile buffer 117. Trace information is then stored in trace buffer 119. These buffers 117 and 119 are then accessible by a user by the normal system I/O, i.e. the results can be viewed on display 38, or stored to disk 20, or the like.

FIGS. 3A-3D are a flowchart illustrating the operation of the trace interrupt handler software of the present invention. This software is part of the operating system, in a preferred embodiment the AIX operating system is contemplated to be used by the present invention. Therefore, interrupt handler 115 is included as part of the AIX operating system.

At step 1 the interrupt handler program is invoked and the process identifies registers 105, 107, 109, 111, 113 at step 2. It is then determined at step 3 whether the current instruction address in register 105 is the same as the last, or previous, instruction address plus one. If not, then the routine proceeds to step 4, since the instructions are not sequential. This means that a branch or system interrupt, or the like, has occurred. Step 5 then determines whether the instruction address information is to be used for tracing or profile. If the information is to be used for profiling, then the count for last instruction address is updated in the profile buffer 117 (step 6). However, for tracing the last instruction address itself is provided to trace buffer 119. Subsequent to both steps 6 and 7, the process continues to step 8. Also, if it was determined that the instructions were sequential, at step 3, the method proceeds to step 8. It is then determined if the instruction was either a load or a store (step 8). If so, then step 9 determines whether the information is to be used for profile or trace. If the instruction was neither a load nor store, the routine skips to step 14 (discussed below). If the load/store determination information is to be used as profile data, then the count information corresponding to the data address, for data being operated on by the instruction, is logged in profile buffer 117, at step 13.

However, for trace information, the actual address of the memory location at which the data that was operated on by the instructions is logged in the trace buffer 119. Subsequent to step 10, it is then determined if the number of bytes moved is equal to 0 (step 11), if not, then the number of bytes moved by the load or store operation are placed in trace buffer 119 (step 12). If the number of bytes moved is equal to 0, i.e. no bytes were moved, then the process continues to step 14. It is then determined if an address mapping change has occurred. More specifically, if register 113 contains a binary "1" then an address mapping change has occurred, i.e. the last instruction changed the effective to virtual address mapping. If a logical "0" is present in register 113, then the last instruction did not change address mapping. As noted above, an address mapping change is an alteration to the look-up table used to translate an effective address to a virtual address. If it is determined that an address mapping change has occurred, then the new mapping (relationship of effective address to virtual address) is stored in trace buffer 119 step 15).

If it was determined that the address mapping did not change, and subsequent to step 15, the current instruction address is saved, at step 16, for comparison purposes. Step 17 sets the last instruction address equal to the current instruction address effectively incrementing the current instruction address to make it the "new" last instruction address. Step 18 then determines if there are more instructions to process. If so, the procedure returns to step 3. If not, the process continues to step 19 and ends.

Following is the pseudocode for the trace interrupt software of the present invention. This pseudocode describes the activity that would take place in the trace interrupt handler, when a trace interrupt is incurred. Note that the pseudocode assumes the existence of five registers, including the instruction address and data address registers. These registers are illustrated in FIG. 2, which is a block diagram of the hardware aspect of the present invention. Along with the instruction and data address registers, a Load_Store register is provided that contains a 1 if the last instruction was a load or store, otherwise it contains 0. The Number_of_Bytes_Moved register contains the number of bytes moved by the last instruction, if the last instruction was a load or store whose operand size is only known at run-time, otherwise it contains 0. The problem here is that standard RISC systems have load and store instructions whose operand size (i.e. number of bytes moved) is given by a register value at run-time: The Address_Mapping_Change register contains a 1 if the last instruction changed the effective-to-virtual address mapping, otherwise, it contains 0.

```
Pseudocode
Registers:
    Instruction_Address
    Data Address
    Load_Store
    Number_of_Bytes_Moved
    Address_Mapping_Change
Variables:
    Last_Instruction_Address (Address of the previous, or
                                  last instruction executed)
Code:
    if (Instruction_Address) does not equal
        (Last_Instruction_Address + 1)
        /* instructions were not sequential, branch or
           interrupt took place */
    {
        if (Tracing)
            /* Record non_sequentiality */
            Place Last_Instruction_Address in trace buffer
    }
    if (Profiling)
        Update Count for Last_Instruction_Address
    if (Load_Store equals 1)
    {
        if (Tracing)
        {
            Place Data_Address in trace buffer
            if (Number_of_Bytes_Moved does not equal 0)
                Place Number_of_Bytes in trace buffer
        }
        if (Profiling)
            Update Count for Data Address
    }
    if (Address_Mapping_Change equals 1)
    {
        Place new address mapping in trace buffer
    }
    /* save away Instruction_address for comparison next
       time through */
    Last_Instruction_Address = Instruction_Address;
    Resume execution at instruction at
    Instruction_Address;
```

Although certain preferred embodiments have been shown and described it should be understood that many changes and modifications can be made therein without departing from the scope of the appended claims.

We claim:

1. A method of recording trace information relating to the execution of instructions on a processor unit, comprising the steps of:
    storing instruction information output from at least one execution unit in said processing unit;
    determining from said instruction information whether said instructions access data from a memory subsystem; and
    determining from said instruction information, stored in said processor unit, a data address at which said data, operated on by said instructions, was accessed.

2. A method according to claim 1 wherein said step of determining whether said instructions access data, comprises the step of determining a quantity of data accessed from said memory location, and for storing said quantity as trace information.

3. A method according to claim 2 wherein said step of determining a data address comprises the steps of:
- mapping said data address to a physical location in said memory subsystem; and
- mapping an instruction address at which said instructions were accessed to a physical location in said memory subsystem.

4. A method according to claim 3 further comprising the step of determining from said instruction information if any of said instructions, executing on said processing unit, have altered said means for mapping.

5. A method according to claim 4 wherein said step of determining if said instructions have been altered comprises the step of storing alterations to said means for mapping as trace information.

6. A method according to claim 5 wherein said step of determining whether said instructions access data comprises the step of determining whether said instructions are a load instruction or a store instruction.

7. A processor unit that records trace information relating to the execution of instructions on said processor unit, comprising:
- means for storing instruction information output from at least one execution unit in said processing unit;
- means for determining from said instruction information whether said instructions access data from a memory subsystem; and
- means for determining from said instruction information, stored in said processor unit, a data address at which said data, operated on by said instructions, was accessed.

8. A system according to claim 7 wherein said means for determining whether said instructions access data, comprises means for determining a quantity of data accessed from said memory location, and for storing said quantity as trace information.

9. A system according to claim 8 wherein said means for determining a data address comprises:
- means for mapping said data address to a physical location in said memory subsystem; and
- means for mapping an instruction address at which said instructions were accessed to a physical location in said memory subsystem.

10. A system according to claim 9 further comprising means for determining from said instruction information if any of said instructions, executing on said processing unit, have altered said means for mapping.

11. A system according to claim 10 wherein said means for determining if said instructions have been altered comprises means for storing alterations to said means for mapping as trace information.

12. A system according to claim 11 wherein said means for determining whether said instructions access data comprises means for determining whether said instructions are a load instruction or a store instruction.

13. A system according to claim 12 further comprising means for recreating said instructions which have previously executed on said processing unit from said means for mapping and said trace information.

14. A system according to claim 13 wherein said means for storing comprises a plurality of registers connected to the output of said at least one execution unit.

15. A system according to claim 14 wherein said means for mapping comprises a look up table.

16. A system according to claim 15 further comprising:
- buffer means for storing said trace information; and
- means, connected to said buffer means, for outputting said trace information.

* * * * *